Jan. 15, 1952  H. A. KROENLEIN  2,582,488
BEAM COMPASS
Filed Sept. 24, 1947
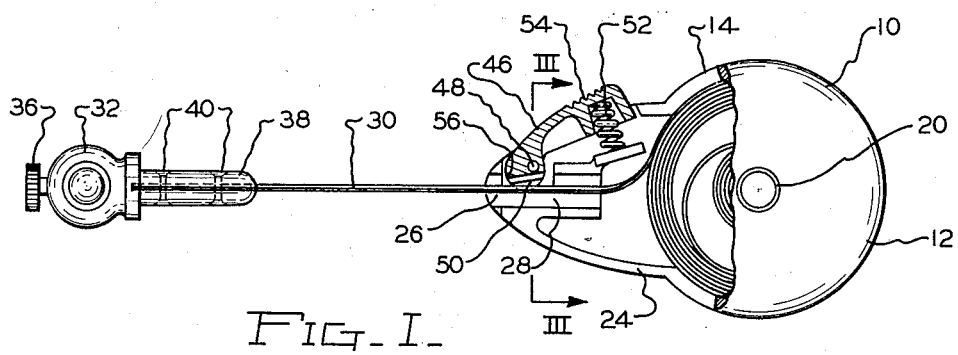
FIG. I.
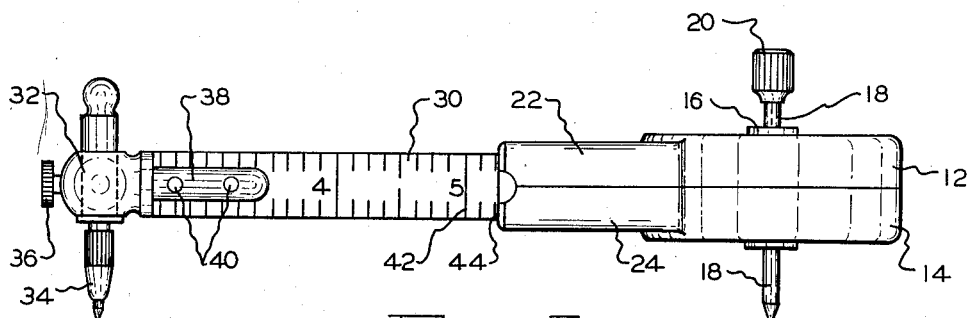
FIG. II.
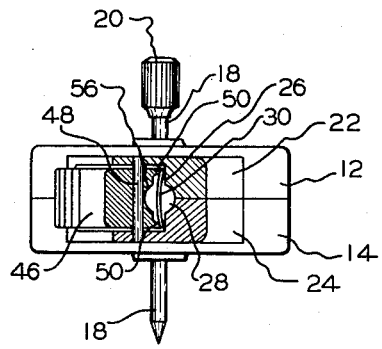
FIG. III.
Inventor
HENRY A. KROENLEIN
By Beaman & Patch
Attorneys Patented Jan. 15, 1952

2,582,488

UNITED STATES PATENT OFFICE 2,582,488

BEAM COMPASS

Henry A. Kroenlein, Los Angeles, Calif.

Application September 24, 1947, Serial No. 775,849

1 Claim. (Cl. 33—27)

The present invention relates to improvements in beam compasses used to scribe circles and arcs of large diameter, and more particularly to the type of beam compasses which employ a semirigid metal tape of slightly arcuate form in place of a rigid beam.

The development of beam compasses using the semirigid metal tape in place of the older rigid beam has been fairly rapid, but the common criticism of these articles as now provided is that they are not accurate and that they are relatively difficult to use since the rigidity of the usual steel tape is not sufficient for this type of work. I have found that by mounting the tape so that the reel housing holding the tape is parallel to the work and the cross section of the tape is perpendicular to the work, I am able to take advantage of more of the inherent rigidity in the rolled metal tape. I have likewise solved the problem of accuracy by providing that the metal tape enter the housing in which the reel is enclosed in a direct line between the fulcrum point and the scribing point. This arrangement not only increases the accuracy of the rule and takes more complete advantage of the inherent stiffness of the tape, but it also provides a tool which has a balanced feel and is therefore easier to work with.

It is, therefore, an object of this invention to provide a tape type beam compass in which the reel is positioned in a plane parallel to the plane of the work while the cross section of the tape is vertical to the work.

It is also an object of this invention to provide a tape type beam compass in which the tape enters the reel housing through a slot which is directly in line between the fulcrum and the scribing point.

A further object is to provide a tape type beam compass which has the improved qualities of accuracy and rigidity.

A still further object is to provide such a compass which has the balance of a fine tool, and which is, therefore, easier to use.

Still another object is to provide means associated with the scribing head to prevent injury to the tape in its rolled up condition in case the tool is abused or misused.

Further objects and advantages of my invention will be apparent from a consideration of the following specification in connection with the appended claim and the accompanying drawings, in which Fig. I is a view in top elevation of my beam compass with part of the top part of the housing broken away and with the braking member shown in section, Fig. II is a view in side elevation, and Fig. III is a sectional view in elevation on the line III—III of Fig. I.

In the drawings the reel housing 10 comprises the upper and lower mated sections 12 and 14 being held in their assembled position by a hollow axial shaft 16, in which is provided bearings, not shown, to hold the fulcrum or centering needle 18 with its knurled head 20. The body portions 12 and 14 have laterally extending mated ear portions 22 and 24 which together define the channel 26, of a relatively narrow cross section, and the channel 28, which is circular in cross section.

The tape 30, which is wound and stored within the housing 10 in any convenient and well known fashion, is fed out through the channel 26 and holds at its other end the scribing head 32. The scribing head 32 is constructed to removably receive a variety of selected scribing instruments, such as the lead pencil 34 shown in Fig. II, or others such as pens or needles. The set screw 36 is used to position these scribing instruments within the scribing head 32.

The scribing head 32, at its junction with the tape 30, is fitted with a pair of extensions 38 which embrace the tape 30, the whole being held as a rigid unit by the rivets 40. The extensions 38 are a rigid part of the scribing head 32, such that when the tape 30 is retracted within the housing 10 and the extension 38 lies in the channel 28, the entire structure is relatively rigid and is not easily damaged by rough handling.

The tape 30 is provided with graduations 42, which may be read against an indicating edge 44, thereby providing a beam compass which may be set instantly to the correct radius without reference to any extra scales or rulers.

In order that the beam compass of this character works properly, it is necessary to provide means for stopping the movement of the tape into and out of the housing 10 while the compass is being used. This is accomplished by means of a spring loaded cammed fulcrum brake lever. The brake lever 46 rotates about a fulcrum pin 48 and has a pair of brake feet 50, which operate to hold the tape 30 against the wall of the channel 26, thereby preventing movement of the tape 30. It will be appreciated that the spring 52 normally holds the brake feet 50 against the tape 30 and that when it is desired to move the tape 30, the knurled portion 54 of the brake lever is pressed, thereby removing the brake feet 50 from contact with the tape 30, which allows the tape to be moved as desired. A concave surface 56 between the brake shoes 50 engages with the extension 38 when it is lying in the channel 28 to hold the scribing head 32 in its stored position adjacent the housing 10. It will be appreciated that the action of the spring 52 in combination with the short lever from the fulcrum pin 48 to the brake shoes 50 and 56 will give a very positive braking action to this structure.

Having thus described my invention, what I desire to claim and protect by Letters Patent is:

A beam compass comprising a hollow housing part having a peripheral tape guiding structure having a tape guiding channel, an axial centering pin extending through said housing, a flexible tape within said housing part and coiled about the centering pin with the outer end of the tape projecting through said guide structure, a scribing head attached to the outer end of said tape and having an elongated tape stiffener rigidly mounted thereon, said stiffener having stiffening engagement along a portion of the tape inwardly from its outer end, structure defining an elongated socket in said housing part in a position to accommodate said stiffener with the tape positioned for guiding its movement with respect to said guide aperture, said socket having a side opening, a brake jaw pivotally mounted on said housing part adjacent said opening in position to be projected into and out of said side opening to engage either said stiffener or said tape, said tape guiding channel merging into said socket from one side of the latter and extending in the direction of the longitudinal axis of the socket.

HENRY A. KROENLEIN.

REFERENCES CITED

The following references are of record in the file of this patent:

UNITED STATES PATENTS

| Number | Name | Date |
|---|---|---|
| 353,851 | Fountain | Dec. 7, 1886 |
| 1,045,300 | Lary et al. | Nov. 26, 1912 |
| 1,613,676 | Raphael | Jan. 11, 1927 |
| 2,038,099 | Coe | Apr. 21, 1936 |
| 2,065,143 | Metcalf | Dec. 22, 1936 |
| 2,105,149 | Keuffel | Jan. 11, 1938 |
| 2,142,387 | Udell | Jan. 3, 1939 |
| 2,349,670 | Moxey | May 23, 1944 |